US012652601B2

(12) United States Patent
Zheng et al.

(10) Patent No.: US 12,652,601 B2
(45) Date of Patent: Jun. 9, 2026

(54) ROUTE CALCULATION METHOD, DEVICE, AND SYSTEM

(71) Applicant: HUAWEI TECHNOLOGIES CO., LTD., Shenzhen (CN)

(72) Inventors: Haomian Zheng, Dongguan (CN); Lei Mao, Dongguan (CN); Zeshan Chang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 606 days.

(21) Appl. No.: 17/944,422

(22) Filed: Sep. 14, 2022

(65) Prior Publication Data

US 2023/0007563 A1     Jan. 5, 2023

Related U.S. Application Data

(63) Continuation of application No. PCT/CN2020/127356, filed on Nov. 7, 2020.

(30) Foreign Application Priority Data

Mar. 16, 2020    (CN) .......................... 202010180618.6

(51) Int. Cl.
*H04W 40/12*          (2009.01)
*H04W 40/24*          (2009.01)

(52) U.S. Cl.
CPC ........... *H04W 40/12* (2013.01); *H04W 40/24* (2013.01)

(58) Field of Classification Search
CPC .... H04J 14/0267; H04L 45/123; H04L 45/42; H04L 45/62
See application file for complete search history.

(56) References Cited

U.S. PATENT DOCUMENTS 10,320,666 B2 *  6/2019  Jiao .......................... H04L 45/64
2013/0308945 A1 *  11/2013  Dhillon .............. H04Q 11/0003
398/48

(Continued)

FOREIGN PATENT DOCUMENTS

CN          101572837 A      11/2009
CN          101656589 A       2/2010

(Continued)

OTHER PUBLICATIONS

Gonzalez De Dios, et al., "Framework and Requirements for GMPLS-Based Control of Flexi-Grid Dense Wavelength Division Multiplexing (DWDM) Networks", Internet Engineering Task Force (IETF), RFC 7698, IETF Trust, Nov. 19, 2015, pp. 1-42.

*Primary Examiner* — Bo Hui A Zhu
*Assistant Examiner* — Alvin Zhu
(74) *Attorney, Agent, or Firm* — Maier & Maier, PLLC

(57)                ABSTRACT

A route calculation method, device, and system. The route calculation method includes: receiving, by a first device, a service request message, where the service request message is used to request the first device to determine a transmission path of a borne service requested by the service request message to be established; and determining, by the first device, a transmission path of the service based on the service request message and first bearing capability information, where the first bearing capability information is used to indicate an actual bearing capability of each link on the transmission path. According to the foregoing solution, the system can calculate a route and configure the service based on an actual service bearing capability of each link of a network.

15 Claims, 5 Drawing Sheets

(56)  References Cited

U.S. PATENT DOCUMENTS

| | | | | |
|---|---|---|---|---|
| 2017/0257684 A1* | 9/2017 | Anand | .................. | H04L 45/745 |
| 2018/0278511 A1* | 9/2018 | Bruno | .................... | H04L 45/64 |
| 2018/0367214 A1* | 12/2018 | Woodward | .......... | H04J 14/0271 |

FOREIGN PATENT DOCUMENTS

| | | | |
|---|---|---|---|
| CN | 102026046 | A | 4/2011 |
| CN | 102143066 | A | 8/2011 |
| CN | 102255801 | A | 11/2011 |
| CN | 103535050 | A | 1/2014 |
| CN | 103607516 | A | 2/2014 |
| CN | 105634954 | A | 6/2016 |
| CN | 105897575 | A | 8/2016 |
| CN | 106877969 | A | 6/2017 |
| CN | 108781183 | A | 11/2018 |
| EP | 2748957 | B1 | 2/2019 |
| WO | 2013034201 | A1 | 3/2013 |

* cited by examiner

| Device | Attenuation | Nominal SW | Actual SW |
|--------|-------------|------------|-----------|
| B | 0.5 dB | 75 G | 58 G |
| | 3 dB | 75 G | 59 G |
| | 6 dB | 75 G | 63 G |

| Device | Attenuation | Nominal SW | Actual SW |
|--------|-------------|------------|-----------|
| C | 0.5 dB | 75 G | 60 G |
| | 3 dB | 75 G | 62 G |
| | 6 dB | 75 G | 66 G |

| Device | Attenuation | Nominal SW | Actual SW |
|--------|-------------|------------|-----------|
| A | 0.5 dB | 75 G | 61 G |
| | 3 dB | 75 G | 63 G |
| | 6 dB | 75 G | 65 G |

ROUTE CALCULATION METHOD, DEVICE, AND SYSTEM

CROSS-REFERENCE TO RELATED APPLICATIONS

This application is a continuation of International Application No. PCT/CN2020/127356, filed on Nov. 7, 2020, which claims priority to Chinese Patent Application No. 202010180618.6, filed on Mar. 16, 2020. The disclosures of the aforementioned applications are hereby incorporated by reference in their entireties.

TECHNICAL FIELD

The embodiments relate to the field of communication technologies, a route calculation method, a device, and a system.

BACKGROUND

For each network device in a communication system, a slot width (SW) is a parameter usually used to express a network resource status of a current device. An actual physical meaning of the slot width is a nominal slot width of the device. However, due to various physical effects in an optical network, an actual slot width of the device in the network is usually lower than a nominal slot width. For example, an actual available resource of a nominal slot width of 50 G may be only 45 G or even 40 G.

Although the actual slot width is less than a value of the nominal slot width, service transmission is not affected because a physical layer service is less affected by physical attenuation when transmitted at a low rate (100 G or below). However, when a future optical network bears a high-rate service (400 G or above), impact of physical attenuation on the actual slot width increases. This may increase a difference in transmission rates of services that can be actually borne. In the conventional technology, a spectrum difference between wavelength channels cannot be discriminated by using the slot width directly to represent a spectrum resource of the device, and consequently, the most appropriate path cannot be selected to bear a service.

SUMMARY

The embodiments may provide a route calculation method, device, and system, to resolve a problem of low service provisioning efficiency due to a mismatch between a nominal service capability and an actual service bearing capability of a device in a high-rate scenario.

To achieve the foregoing objectives, the embodiments provide the following solutions. According to a first aspect, an embodiment provides a route calculation method, including: A first device receives a service request message, where the service request message is used to request the first device to determine a transmission path that bears a service requested by the service request message to be established; and the first device determines a transmission path of the service based on the service request message and first bearing capability information, where the first bearing capability information is used to indicate an actual bearing capability of each link on the transmission path.

According to this embodiment, the first device can learn an actual service bearing capability of the transmission path based on the first bearing capability information, and then determine an appropriate transmission path based on a service request, thereby improving efficiency of service configuration.

With reference to the first aspect, in a possible implementation, before the first device receives the service request message, the method further includes: The first device receives second bearing capability information sent by another device.

The first bearing capability information identifies an actual bearing capability of each link on a transmission path of the service requested by the service request message to be established; and the second bearing capability information identifies an actual bearing capability of at least one link on the transmission path. The second bearing capability information is a subset of the first bearing capability information. The first bearing capability information includes the second bearing capability information sent by the another device.

With reference to the first aspect, in another possible implementation, the first device stores at least bearing capability information of a link in which the first device is located. Therefore, the first device stores at least third bearing capability information of a downstream link in which the first device is located.

It should be noted that the third bearing capability information identifies an actual bearing capability of the downstream link in which the first device is located. It should be understood that the third bearing capability information is a subset of the first bearing capability information. In an example, the first bearing capability information is equal to a set of the second bearing capability information and the third bearing capability information.

With reference to the first aspect, in a possible implementation, the first bearing capability information includes an actual slot width of the at least one link on the transmission path.

With reference to the first aspect, in another possible implementation, the first bearing capability information includes a service rate that can be actually supported by the at least one link on the transmission path.

In this embodiment, only an actual slot width and an actual maximum transmission rate are used as examples for description. It should be understood that, actually, the first bearing capability information further has a plurality of other variant formats.

With reference to the first aspect, in a possible implementation, the first bearing capability information further includes at least one of channel attenuation, a bearer wavelength, or a nominal slot width of the at least one link on the transmission path. Therefore, with extension at different latitudes, the first device may obtain actual bearing capabilities of some network devices on channels of different attenuation levels and different wavelengths.

With reference to the first aspect, in a possible implementation, the method for determining a service transmission path is applicable to a scenario in which the service is transmitted at a high rate.

It should be noted that, in this embodiment, the high-rate transmission scenario means that a service transmission rate is higher than 100 Gbps, and a low-rate transmission scenario means that the service transmission rate is lower than 100 Gbps. In addition, it should be understood that a service transmission rate in a current communication network is a discrete value, for example, 50 G, 100 G, 200 G, or 400 G. Therefore, if a link supports a service with a transmission rate of 400 G or below, it means that the link can support services with different rates, such as 400 G, 200 G, 100 G, and 50 G.

With reference to the first aspect, in a possible implementation, the service request message includes a path establishment request for a new service and/or a path re-establishment request for an existing interrupted service. Therefore, route calculation may be implemented through topology collection, and rerouting may be performed when a service is faulty.

With reference to the first aspect, in another possible implementation, the first device is a source device of the transmission path.

With reference to the first aspect, in a possible implementation, the first device is a centralized controller of a network in which the service is located. Therefore, the embodiments may be applied to both a scenario of centralized management and a scenario of distributed management.

According to a second aspect, an embodiment may provide a route calculation device, including: a receiving module, configured to receive a service request message; and a calculation module, configured to determine, based on the service request message and first bearing capability information, a transmission path of a service requested by the service request message to be established, where the first bearing capability information is used to indicate an actual service bearing capability of each device on the transmission path.

With reference to the second aspect, in a possible implementation, the receiving module is further configured to receive second bearing capability information sent by another device.

With reference to the second aspect, in another possible implementation, the device further includes a storage module, and the storage module is configured to store at least third bearing capability information of a downstream link in which the first device is located.

With reference to the second aspect, in a possible implementation, the first bearing capability information includes an actual slot width of at least one link on the transmission path.

With reference to the second aspect, in another possible implementation, the first bearing capability information includes a service rate that can be actually supported by the at least one link on the transmission path.

With reference to the second aspect, in a possible implementation, the first bearing capability information further includes at least one of channel attenuation, a bearer wavelength, or a nominal slot width of the at least one link on the transmission path.

With reference to the second aspect, in a possible implementation, the receiving module is further configured to receive an extended protocol, and the extended protocol is used to identify a field in which the bearing capability information is located.

With reference to the second aspect, in another possible implementation, the receiving module is further configured to receive the service request message, where the service request message includes a path establishment request for a new service and/or a path re-establishment request for an existing interrupted service. Therefore, route calculation may be implemented through topology collection, and rerouting may be performed when a service is faulty.

According to a third aspect, an embodiment may provide a route calculation system. The system includes at least one device according to any one of the second aspect or the possible implementations of the second aspect.

According to a fourth aspect, the embodiments may provide a non-transitory computer readable storage medium. The non-transitory computer readable storage medium stores a computer program or instructions. When the program or instructions are run, a device is driven to perform the method according to any one of the first aspect or the possible implementations of the first aspect.

According to a fifth aspect, an embodiment may provide a computer program product. The computer program product includes a computer program or instructions. When the computer program or instructions are executed by a computer, the computer is enabled to perform the method according to any one of the first aspect or the possible implementations of the first aspect.

In the embodiments, in a process of topology collection and route flooding, bearing capability information of a device is added to indicate an actual bearing capability of each link, so that a source device can match a service based on an actual bearing capability of a path, resolving a problem of service provisioning failure or low service provisioning efficiency due to a mismatch between a nominal service capability and an actual service bearing capability of a device in a high-rate scenario.

BRIEF DESCRIPTION OF THE DRAWINGS

To describe the embodiments more clearly, the following briefly describes accompanying drawings for describing the embodiments. It is clear that the accompanying drawings in the following descriptions merely show some embodiments, and a person of ordinary skill in the art can derive other implementations from these accompanying drawings without creative efforts.

DETAILED DESCRIPTION OF THE EMBODIMENTS

Figure 1:
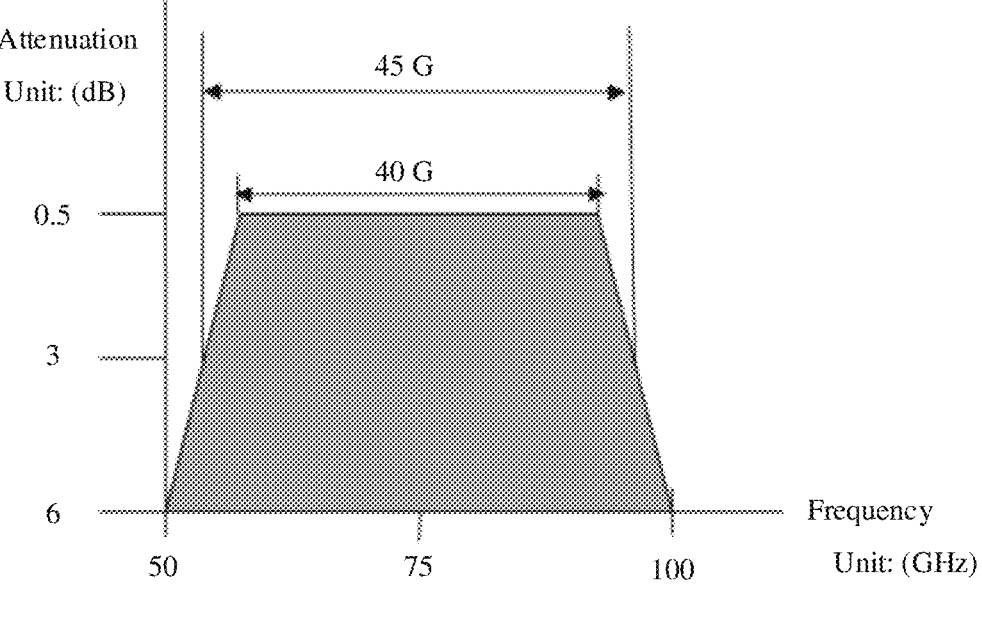
FIG. 1 is an example diagram of an attenuation-spectrum according to an embodiment.

To make objectives, solutions, and advantages of the embodiments clearer, the following further describes the embodiments in detail with reference to the accompanying drawings. An operation method in a method embodiment may also be applied to an apparatus embodiment or a system embodiment.

The embodiments may be applicable to a service transport network. For example, the embodiments ay be applied to an optical transport network (OTN) or may be applied to a packet transport network (PTN), or a wavelength division multiplexing (WDM) network. In addition, the embodiments may be further applicable to a wireless network (for example, a base station or a microwave) and an access network, for example, fiber to the X (FTTX). In the embodiments, an application scenario of the optical transport network is used as an example, but this does not constitute a limitation on scope of the embodiments.

With rapid development of communication network services, traffic demands of users are increasing. Currently, a 100 G industry chain is mature and commercially used on a large scale. In the future, a beyond-100 G optical transmission system will further increase a network capacity on the basis of 100 G, and reduce transmission costs and power consumption, thereby effectively addressing current pressure of continuous growth of service traffic and network capacity. A key technology for beyond-100 G optical transmission is mature or is being matured rapidly. However, the following problem often occurs in a service configuration process: After a transmission path that meets a transmission rate requirement of a service is determined based on information such as a service request and a network topology, the service cannot be successfully provisioned. There may be a plurality of reasons why the service cannot be successfully provisioned, such as intermittent disconnection on device, network flapping, and an incorrect interface type. However, after the foregoing reasons are all excluded, the service still cannot be successfully provisioned. Actually, a real reason why the service cannot be successfully provisioned is that a rate of the determined transmission path cannot meet a service requirement. This is hardly identified in an actual network operation and maintenance process because a bearing capability of each link marked in a communication network is a nominal value. The nominal value is higher than an actual value in a beyond-100 G transmission network and a difference between the nominal value and the actual value is relatively large. Such a mismatch between the nominal value and the actual value of the bearing capability may finally cause a failure of service provisioning.

The embodiments may include the following general terms:

(1) Modulation Format

In an optical communication process, modulation is a process in which a baseband signal is converted into a transmission signal by using a channel symbol at a transmit end. To-be-sent bit information may be borne by the channel symbol. The modulation format is a manner in which bit information is borne by the channel symbol, for example, amplitude modulation, frequency modulation, or phase modulation. Different modulation formats allow the channel symbol to bear different bits of bit information. For example, in a dual polarization 16 quadrature amplitude modulation (DP-16QAM) format, each channel symbol can bear 8-bit information. In a 16 quadrature amplitude modulation (16QAM) format, each channel symbol can bear 4-bit information. In a quadrature phase shift keying (QPSK) format, each channel symbol can bear 2-bit information.

(2) Baud Rate

The baud rate refers to a quantity of element symbols to be transmitted per second. The baud rate is a metric for measuring a data transmission rate and is represented by a quantity of times when a modulation state of a carrier changes per unit time. In terms of a spectrum, a 1 GHz spectrum corresponds to a 1 GBaud baud rate. In the optical communication, a service transmission rate is equal to a product of the baud rate and a quantity of bits that can be borne by each channel symbol in a modulation format. It should be noted that, in this embodiment, only a case in which the spectrum corresponds to the baud rate is used as an example for description, and a case in which the baud rate does not correspond to the spectrum is not considered temporarily.

(3) Service Rate

The service rate refers to a requirement for the baud rate in a corresponding modulation format when a service with a rate is transmitted. For example, a service with a rate of 400 G is borne by using the DP-16QAM modulation format. Because each channel symbol in the format can bear 8-bit information, a 60 G baud rate is required for implementation. The 60 G baud rate indicates that a spectrum of at least 60 GHz is used for service bearing at a 3 dB attenuation level. Therefore, based on the foregoing relationships between the service transmission rate and the baud rate, and between the service transmission rate and the quantity of bits borne by each channel symbol, it can be understood that 60 G symbol/s*8 bits/symbol=480 Gbps, which can support a service with a rate of 400 G after bit resources occupied by overheads and the like are deducted.

It should be noted that, in the embodiments, terms such as a channel, a path, and a link appear a plurality of times, and meanings and applications of the three terms are different, and are explained and described as follows: The channel in the embodiments may be a physical channel, and refers to a passage in which information is transmitted through a physical medium. The path, also referred to as a transmission path, a service path, or the like, refers to an entire route from a start point to an end point. The path includes not only the foregoing physical channel that bears information, but also a network device that sends, receives, and processes information. In addition, unlike the channel, the path has a direction, which is a transmission direction of the service. The link refers to a passive point-to-point physical connection. In wired communication, the link may refer to a physical line between two devices, such as a cable or an optical fiber. In radio communication, the link refers to path space for propagating an electromagnetic wave between a base station and a terminal. The link is a physical line from one node to a neighboring node without any other switching node in between. Actually, the path may include a plurality of links.

(4) Path Computation Element

A path computation element (PCE) is a centralized computation element and is configured to perform complex path computation based on network resource information of the path computation element, such as a network topology, a device, and current resource usage. When receiving a request of a path computation client (PCC), the path computation element returns path information to the PCC through route calculation based on current information about available network resources.

(5) Link Management Protocol

The link management protocol (LMP) is used to set and control a link and may implement a function of link management. Currently, network route calculation depends on understanding of a network topology and resource, and the information may be obtained by using a centralized central network management system or a distributed link-state routing protocol. The LMP is a general protocol designed for this purpose and may automatically discover all links and neighboring devices of a local device. In addition, for different switching technologies, the LMP may be extended to an OTN LMP, a wavelength division LMP, or the like. The embodiments may use an LMP in a wavelength division network.

(6) OSPF Flooding

An open shortest path first protocol (OSPF) is a link-state routing protocol. The OSPF protocol may be used by a network device to transmit a bearing capability message of the network device to a neighboring device and receive bearing capability information sent by the neighboring device. The bearing capability information may include information such as a device type, a switching capacity, and a usage status. By exchanging bearing capability information, each device on the one hand sends its own path state data packet to a neighboring device, and on the other hand receives a path state data packet sent by the neighboring device. In addition, each device updates its own database based on the path state data packet sent by the neighboring device, to obtain bearing capability information of an entire area network.

(7) Physical Attenuation

Based on implementation of a physical layer, behind each nominal slot width, an actual slot width exists along with channel attenuation. The actual slot width usually changes accordingly based on different values of channel attenuation. In a case of no frequency offset and a consistent code type, FIG. 1 shows an instance of an actual slot width. As shown in FIG. 1, the nominal slot width is 50 GHz. However, as the channel attenuation changes, actual slot widths are different at different attenuation levels: at 0.5 dB attenuation, an actual slot width of a same nominal slot width of 50 GHz is only 40 GHz; and at 6 dB attenuation, a corresponding actual slot width is 45 GHz.

It should be understood that, in a high-rate communication scenario, different rates of service bearing have corresponding attenuation-spectrum requirements. For example, a 400 G service needs to implement the 60 G baud rate under 3 dB attenuation in the DP-16QAM modulation format. The baud rate herein is an actual baud rate corresponding to the actual slot width.

Currently, the service bearing capability is expressed without distinguishing the implementation of a physical layer. A unified parameter "slot width" is used to express a resource. An actual physical meaning of the "slot width" is a nominal slot width of the device. For example, Table 1 shows bearing capability information of a link starting from a device A in a network. A slot width in a sending direction of the device A is 50 G, that is, a nominal slot width of an egress port of the device is 50 G.

TABLE 1

| Device property | Slot width |
| --- | --- |
| Device property | Slot width |
| A (outbound) | 50 G |

It should be noted that, in the expression manner of the slot width, the bandwidth in the sending direction of the device A is 50 G, which means that in the sending direction, a bandwidth of each of all wavelengths is 50 G regardless of signal attenuation.

Actually, however, a slot width in an actual network is lower than the nominal slot width due to a plurality of physical effects in an optical network. For a nominal slot width of 50 G, an actual available slot width may be 45 G, or even a different value such as 40 G. The expression manner in Table 1 cannot reflect information about the actual slot width. When the service is transmitted at a low rate, the actual slot width is slightly affected by the physical attenuation. Therefore, service transmission is not affected. However, when the network bears a high-rate service, impact of the signal attenuation on the slot width increases. This may cause a relatively large difference between service rates that can be actually borne by different channels and nominal values, and consequently, transmission of a preset high-rate service cannot be implemented. Currently, a way to resolve this problem is to define all the wavelengths with a bearing capability of a minimum rate in the channel. This may result in a waste of a channel bearing capability.

In conclusion, in this embodiment, a method for determining a service transmission path is provided. In the foregoing topology information collection process, the device additionally collects the bearing capability information. The bearing capability information includes an actual bearing capability of a link. The device may apply the obtained actual bearing capability of the link to scenarios such as evaluating link quality, selecting an appropriate service channel, and quickly recovering the service.

Table 2 shows a slot width expression format according to an embodiment.

TABLE 2

| Device | Attenuation | Nominal SW | Actual SW of a first wavelength | Actual SW of a second wavelength | | Actual SW of an $N^{th}$ wavelength |
| --- | --- | --- | --- | --- | --- | --- |
| A | 0.5 dB | 75 G | 61 G | 62 G | . . . | 63 G |
| | 3 dB | 75 G | 63 G | 64 G | . . . | 64 G |
| | 6 dB | 75 G | 65 G | 65 G | . . . | 66 G |

As shown in Table 2, in a scenario of network topology collection, an expression of the slot width is extended by two dimensions.

(a) Attenuation Dimension

Compared with Table 1, the attenuation dimension is added in this embodiment, reflecting an actual slot width difference of a same wavelength channel under different attenuation requirements: an actual slot width at attenuation levels of 0.5 dB, 3 dB, and 6 dB. For example, the actual slot widths of the first wavelength on the device A at attenuation levels of 0.5 dB, 3 dB, and 6 dB are respectively 61 G, 63 G, and 65 G. Based on a data transmission requirement in a bearer network, the high-rate service has different requirements on slot widths of the channel at different attenuation levels. It should be noted that 0.5 dB, 3 dB, and 6 dB are all typical values for network application and are not unified criteria. In actual use, a more detailed requirement may be imposed on attenuation at another level. This is not limited.

(b) Wavelength Dimension

Compared with Table 1, this embodiment shows actual slot widths corresponding to different wavelength channels. For example, the first wavelength, the second wavelength, . . . , and the $N^{th}$ wavelength have different actual SWs at a same attenuation level. This expression allows a control unit or a centralized controller of the device to select the most appropriate wavelength channel during route selection to bear the service.

The expressions of the slot width of the foregoing two dimensions may be used in combination. With the expressions, the device may obtain an actual slot width corresponding to each wavelength channel, to learn a capability of each wavelength to bear the service. For example, the first wavelength can bear a service with a rate of 400 G or below, and the second wavelength can bear a service with a rate of 100 G or below. Correspondingly, the spectrum expressions shown in Table 2 may have variants shown in Table 3.

TABLE 3

| Device | Attenuation | Nominal SW | Bearing capacity of a first wavelength | Bearing capacity of a second wavelength | | Bearing capacity of an $N^{th}$ wavelength |
| --- | --- | --- | --- | --- | --- | --- |
| A | / | 75 G | 400 G or below | 100 G or below | . . . | 800 G or below |

As shown in Table 3, the device A does not necessarily need to flood full information or report each attribute in the table, but only needs to provide an expression about the service bearing capability. It should be understood that an $x^{th}$ wavelength bearing capability in Table 3 is an actual service bearing capability of the device. The actual service bearing capability may be the actual SW when the device bears a service at an attenuation level by using a wavelength, or a maximum transmission rate that can be reached when the device transmits the service at an attenuation level by using a wavelength channel. This embodiment may be described by using the foregoing two examples only. Actually, an expression of an actual service capacity still has another format of variant.

It should be noted that the foregoing bearing capability information may be added in a manner of extending a protocol.

In an example, bearing capability information of each device may be sent to a neighboring device of the device or a network management device by extending the OSPF protocol. A message field between the devices may be extended according to a small computer system interface (SCSI) standard of an RFC 7688 document, and the extended message field is used to increase the bearing capability information. Alternatively, in another example, a parameter field "slot-width" may be added to a Yet Another Next Generation) model to indicate bearing capability information of the link.

For example, the following describes an example in which the bearing capability information is added to the YANG model through field extension:

```
    |      +--ro slot-width* [lambda-id]
    |         +--lambda-id                uint32
    |         +--slot-width-0p5db?         decimal60
    |         +--slot-width-3db?           decimal62
    |         +--slot-width-6db?           decimal64
```

In this example, lambda-id indicates a key value field of the YANG model, and is used to identify information to be sent; uint32 indicates a data type of a key value; "slot-width-0p5db? decimal60" indicates that the actual slot width is 60 G at 0.5 dB channel attenuation; "slot-width-3db? decimal62" indicates that the actual slot width is 62 G at 3 dB channel attenuation; and "slot-width-6db? decimal64" indicates that the actual slot width is 64 G at 6 dB channel attenuation.

According to the schematic diagrams of slot width expression formats of the network device provided in Table 2 and Table 3, on a premise that the LMP protocol and the OSPF protocol are used between communication network devices, each device may obtain service bearing capability information of another device. Based on this, when responding to the service request, the device may select an appropriate service path (for example, a wavelength channel) to bear the service.

Figure 2:
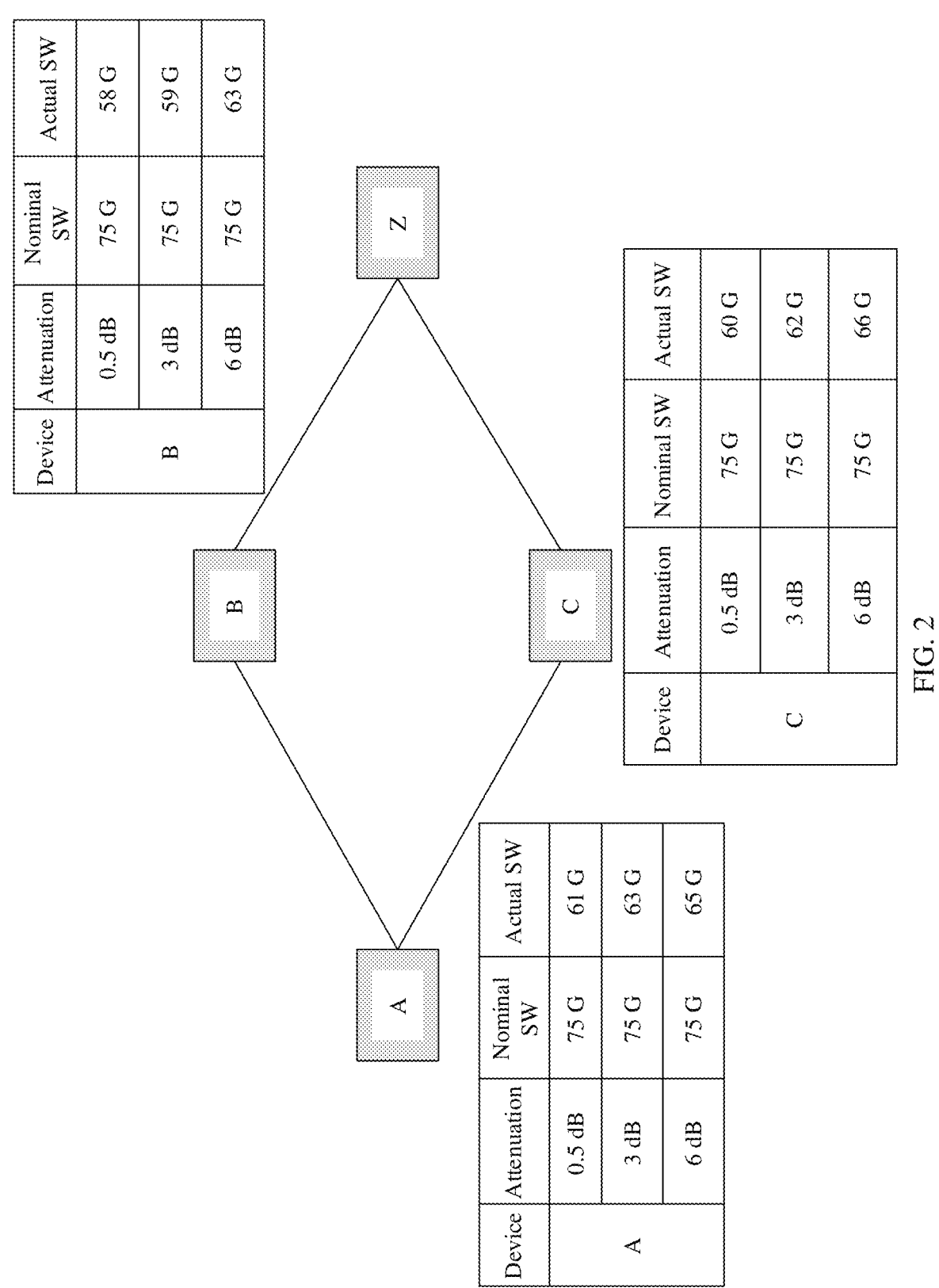
FIG. 2 is a schematic diagram of a network topology applicable to an embodiment.

FIG. 2 is a schematic diagram of a network topology according to an embodiment. As shown in FIG. 2, service bearing capabilities of a network device A, a network device B, and a network device C are shown in slot width matrices corresponding to the network device A, the network device B, and the network device C. It should be noted that a slot width matrix of a device represents bearing capability information of a link starting from the device. Bearing capabilities of a link A-B and a link A-C are shown in a slot width matrix of the device A. When the channel attenuation is 0.5 dB, the actual slot width is 61 G; when the channel attenuation is 3 dB, the actual slot width is 63 G; and when the channel attenuation is 6 dB, the actual slot width is 65 G.

Bearing capability information of a link B-Z is shown in a slot width matrix of the device B. When the channel attenuation is 0.5 dB, the actual slot width is 58 G; when the channel attenuation is 3 dB, the actual slot width is 59 G; and when the channel attenuation is 6 dB, the actual slot width is 63 G. Bearing capability information of a link C-Z is shown in a slot width matrix of the device C. When the channel attenuation is 0.5 dB, the actual slot width is 60 G; when the channel attenuation is 3 dB, the actual slot width is 62 G; and when the channel attenuation is 6 dB, the actual slot width is 66 G.

Figure 3:
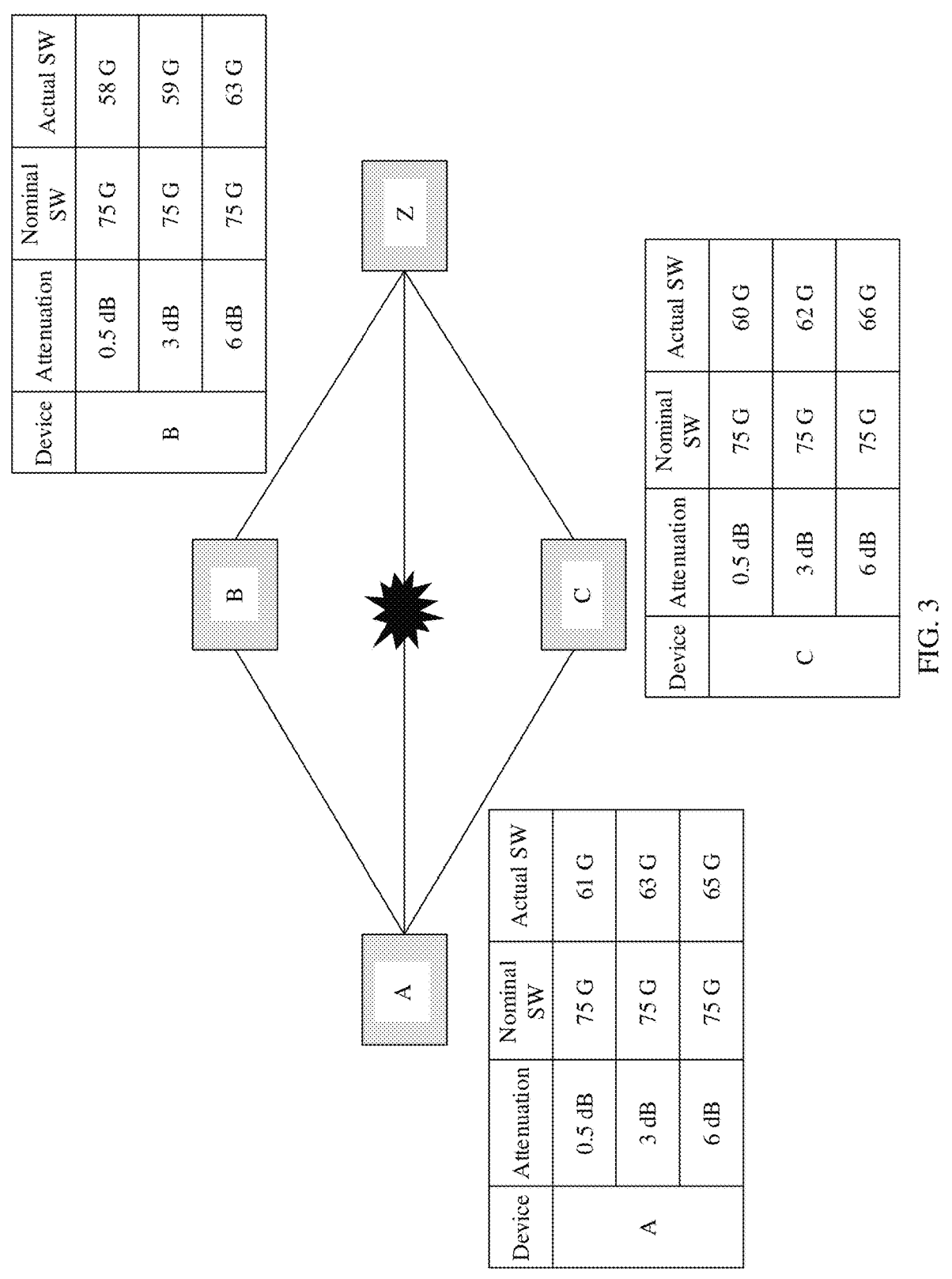
FIG. 3 is a schematic diagram of another network topology applicable to an embodiment.

FIG. 3 is a schematic diagram of another network topology according to an embodiment. As shown in FIG. 3, the service bearing capabilities of a network device A, a network device B, and a network device C are shown in the slot width matrices corresponding to the network device A, the network device B, and the network device C. Attributes of network segments A-B, B-Z, A-C, and C-Z are consistent with attributes of corresponding network segments in FIG. 2, and in this embodiment, none of the network segments bears a service and are in an idle state. Unlike the network topology shown in FIG. 2, in this embodiment, there is a newly added link A-Z, and at least one provisioned service exists in the link A-Z. Because a line is faulty, the service is in an interrupted state, and in this case, an appropriate path needs to be reselected to bear the interrupted service. In this embodiment, the device A may learn an actual bearing capability of each link based on an obtained slot width matrix of each device, to select appropriate transmission paths respectively for interrupted services.

It should be noted that the "actual SW" in the slot width matrix of each device in FIG. 2 and FIG. 3 may be an actual slot width corresponding to one wavelength channel or may be actual slot widths respectively corresponding to a plurality of wavelength channels. Different wavelength channels may correspond to a same slot width or different slot widths. As shown in Table 2, if the actual slot widths corresponding to a plurality of wavelength channels exist, the actual slot widths may be separately represented in the slot width matrix of a device. Based on the foregoing topology information collection, in this embodiment, when the device receives the service request, the appropriate path may be selected through path computation to bear the service.

It should be noted that, for a service bearing capability of the network device in the foregoing embodiment, Table 3 is a possible variant format of Table 2, and a plurality of other variant formats may still exist. For example, a service bearing capability of the device may be expressed in an expression format of "bearer wavelength-service rate-support or not", or in an expression format of "bearer wavelength-modulation format-baud rate (actual SW)".

Figure 4:
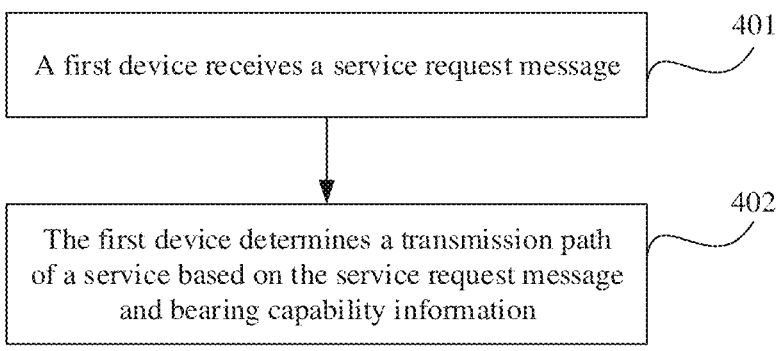
FIG. 4 is a flowchart of a route calculation method applicable to an embodiment.

FIG. 4 is a flowchart of a route calculation method according to an embodiment. The flowchart includes the following steps:

S401: A first device receives a service request message.

In this embodiment, the first device may be a source device for service configuration, and the service request message may be delivered to the first device by using a centralized network controller. The service request message may include information such as a source device, a sink device, a transmission rate, and a transmission delay of a service. For example, that a device A receives the service request message includes that "a 400 G service is provisioned between the device A and a device Z". In this case, the device A is the source device of the service, the device Z is the sink device of the service, and 400 G is the transmission rate of the service. The service request message is used to request the first device to determine a target transmission path of the service requested by the service request message to be established.

S402: The first device determines a transmission path of a service based on the service request message and first bearing capability information.

In this embodiment, the first bearing capability information is used to identify an actual bearing capability of each link on a target transmission path of the service. For example, the first bearing capability information may further identify an actual bearing capability of each link on all candidate transmission paths of the service.

For example, the first bearing capability information includes an actual slot width SW of each link on all the candidate transmission paths. Alternatively, the first bearing capability information includes a service rate that can be actually supported by each link on all the candidate transmission paths. Based on this, the first bearing capability information may further include at least one of channel attenuation, a bearer wavelength, and a nominal slot width of each link on the candidate transmission path. For details about bearing capability information of each link, refer to Table 2 and Table 3.

A process of configuring the 400 G service is used as an example for description. A requirement of the 400 G service for a bearer channel is that the actual SW is not less than 60 G at a 3 dB attenuation level. In this embodiment, first, a network control side sends a request for provisioning the 400 G service between the device A and the device Z to the device A. After receiving the request, the device A starts to calculate whether a transmission path between the device A and the device Z is suitable for bearing the service. For example, in this embodiment, two candidate transmission paths exist between the device A and the device Z, which are respectively A-B-Z and A-C-Z. An actual SW of an A-B segment of the candidate transmission path A-B-Z at 3 dB attenuation is 63 G, which is higher than 60 G required by the service. A transmission path A-B meets the service requirement. An actual SW of a B-Z segment at the 3 dB attenuation is 59 G, which is lower than 60 G required by the service and cannot bear a 400 G service. In conclusion, the candidate transmission path A-B-Z cannot be used to bear the 400 G service. In addition, an actual SW of an A-C segment of the candidate transmission path A-C-Z at the 3 dB attenuation is 63 G, which is higher than 60 G required by the service and can bear the 400 G service. An actual SW of a C-Z segment at the 3 dB attenuation is 62 G, which is higher than 60 G required by the service and can also bear the 400 G service. In conclusion, the candidate transmission path A-C-Z can be used to bear the 400 G service. Based on the foregoing calculation and analysis, the device A finally selects the A-C-Z as a target transmission path to bear the 400 G service.

In an example, before receiving the service request message, the first device first receives second bearing capability information sent by another device. The second bearing capability information is a subset of the first bearing capability information. The first bearing capability information identifies an actual bearing capability of each link on a transmission path of the service requested by the service request message to be established; and the second bearing capability information identifies an actual bearing capability of at least one link on the transmission path.

Optionally, the device A may directly calculate the target transmission path based on the first bearing capability information. If more than one available transmission path is obtained through calculation, the most appropriate transmission path may be selected based on information such as link quality, an available resource, and a transmission delay.

In an example, when a slot width matrix of a network device is expressed by using the format shown in Table 3, the foregoing calculation, analysis, and selection processes are more simplified, and therefore, the device does not need to convert a slot width into the service transmission rate and directly determines whether each path can bear a requested 400 G service at the 3 dB attenuation level. For example, by using a slot width matrix of the device, it is understood that the device A can bear a service of 400 G or below by using a wavelength λ1 at the 3 dB attenuation, a device B can bear a service of 100 G or below by using a wavelength λ2 at the 3 dB attenuation, and a device C can bear the service of 400 G or below by using a wavelength λ3 at the 3 dB attenuation, to determine that the A-B, A-C, and C-Z segments all can bear the service of 400 G or below, and the B-Z segment can bear only the service of 100 G or below. In conclusion, the path A-C-Z is selected to bear the 400 G service. The λ1, λ2, and λ3 may be a same wavelength.

In an example, the foregoing calculation, analysis, and path selection processes may be completed by using a calculation module in the network device or may be performed in some networks by using a path computation element in the centralized network controller. A principle of the path computation element is the same as that of the calculation module. Details are not described again in this embodiment.

It should be understood that, in this embodiment, bearing capability information of the device indicates a service bearing capability of a link starting from the device. For example, bearing capability information of the device A indicates service bearing capabilities of the A-B and A-C segments; bearing capability information of the device B indicates a service bearing capability of the B-Z segment; and bearing capability information of the device C indicates a service bearing capability of the C-Z segment.

It should be noted that, in this embodiment, there are a plurality of formats for expressing bearing capability information of each device, and an actual SW of the device for bearing the service at a particular attenuation level by using a particular wavelength is only one of the expressions. Actually, the expression format of the bearing capability information of the device may have a plurality of variants on the basis of an actual SW of the device, for example, a format expressed by using a maximum rate at which the device bears the service at the particular attenuation level by using the particular wavelength.

In addition, it should be further noted that each device may transmit its bearing capability information to a neighboring node by using an OSPF protocol and receive bearing capability information of the neighboring node and the neighboring node sent by the neighboring node. Based on this, in the foregoing example, the device A may obtain bearing capability information of each device in an area, and determine, based on the bearing capability information of each device, whether each candidate path on which the device A is the first device can bear a service that needs to be configured.

For example, the first device receives the second bearing capability information from another device by using an extended device-to-device communication protocol, and the extended device-to-device communication protocol additionally includes a message field to identify the second bearing capability information. For an extension manner, refer to the foregoing embodiment. Details are not described herein again.

After determining the transmission path of a service, the first device may send service configuration information to a second device. The second device is located on a determined transmission path and is a neighboring downstream device of the first device. The service configuration information may include a service type, a source device, a sink device, a resource reservation request, and the like. The resource reservation request is used to request the second device to reserve a resource for service bearing. In addition, the service configuration information may further include transmission path information, so that hop-by-hop forwarding may be performed on the service configuration information along the transmission path.

In an example, the service configuration information is transmitted between devices on the transmission path by using a resource reservation protocol (RSVP) in a form of signaling.

It should be noted that, in this embodiment, the first device of the service may be replaced with the centralized network controller for implementation. The centralized network controller may receive the service request message, determine the transmission path of the service based on the service request message and bearing capability information, and then deliver the service configuration information to each device. A PCE is a path computation element in the centralized network controller, and has information such as a network topology, the device and its bearing capability, and current resource usage, to implement complex path computation. When receiving the service request message from a PCC, the PCE calculates and determines an available path by using a routing algorithm based on information such as a current network topology, each device and its bearing capability, and the current resource usage, and returns path information to the PCC. For example, when a service bearing path is determined, the centralized network controller sends the service configuration information to the first device, and then the first device and its downstream device forward the service configuration information hop by hop; or the centralized network controller separately delivers the service configuration information to all devices on the determined path, so that all the devices reserve resources for service bearing.

In an example, when a network path fault causes service interruption, service recovery may be implemented by using the route calculation method in the foregoing embodiment. The network topology diagram shown in FIG. 3 may be used as an example. When a path A-Z is faulty, both the two services of 400 G and 100 G are interrupted, and a source device A of the service starts a service recovery mechanism, that is, rerouting, to seek another path to bear the two services. Based on the analysis of the service bearing capability of each network segment in FIG. 2 in the foregoing embodiment, the A-B, A-C, and C-Z segments can all bear the service of 400 G or below, and the B-Z segment can bear only the service of 100 G or below. Therefore, the two services are allocated to the A-B-Z and the A-C-Z respectively for bearing, where the A-B-Z bears the 100 G service and the A-C-Z bears the 400 G service.

In an example, when the path A-Z is faulty, a first device A of the service receives a service recovery request. The service recovery request may include information such as the source device, the sink device, a transmission rate, and the service type of the service, and is used to request the device A to seek another path to bear two existing interrupted services. A first device A may first determine a new transmission path of the 400 G service, and then determine a new transmission path of the 100 G service. Alternatively, the first device A first calculates bearing capabilities of two existing paths, and then allocates the two paths to the two services respectively.

In this embodiment, functional module division may be performed on the device or a control side according to the foregoing method examples. For example, each functional module may be obtained through division corresponding to each function, or two or more functions may be integrated into one processing module. The integrated module may be implemented in a form of hardware or may be implemented in a form of a software functional module. It should be noted that, in the embodiments, division into the modules is an example and is merely logical function division and may be other division in an actual implementation.

Figure 5:
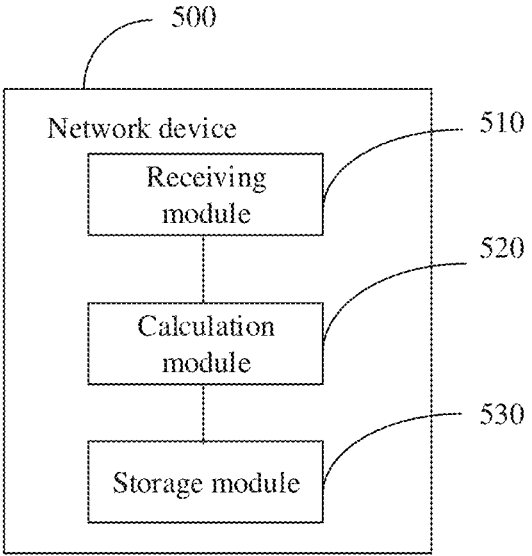
FIG. 5 is a schematic diagram of a structure of a network device according to an embodiment.

FIG. 5 is a schematic diagram of a structure of a network device according to an embodiment. A network device 500 may be any device in the foregoing embodiments or may be the centralized network controller in the foregoing embodiments. In an example, the network device 500 may be configured to perform the steps performed by the source device in the method shown in FIG. 4.

The network device 500 includes at least a receiving module 510, a calculation module 520, and a storage module 530. The receiving module 510 is configured to perform the following step: receiving a service request message. The calculation module 520 is configured to calculate and determine a transmission path of a service based on the service request message and bearing capability information. The storage module 530 is configured to store bearing capability information sent by the network device and another network device. For example, with reference to FIG. 4, the receiving module 510 is configured to perform step S401, and the calculation module 520 is configured to perform step S402.

The receiving module 510 may be further configured to receive the bearing capability information sent by another network device, and this step may be completed before the network device receives the service request message.

In an example, the receiving module 510 is further configured to receive a service recovery request; and the service recovery request is used to request, when a fault in the transmission path of the service causes service interruption, the source device to seek another path to bear the interrupted service. In an example, when the network device 500 is the centralized network controller, the receiving module 510 is configured to receive a service request message sent by a client-side network device; the calculation module 520 is configured to calculate and determine the transmission path of the service based on the service request message and the bearing capability information; and the storage module 530 is configured to store bearing capability information sent by a lower-layer network device.

Optionally, when the network device 500 is the centralized network controller, the receiving module 510 is further configured to receive bearing capability information reported by a plurality of network devices at a physical layer.

Generally, the network device includes an optical-layer device, an electrical-layer device, and an optical-electrical hybrid device. The optical-layer device is a device capable of processing an optical-layer signal, for example, a reconfigurable optical add-drop multiplexer (ROADM). The electrical-layer device is a device capable of processing an electrical-layer signal, for example, an optical transmission device, a switch, and a router that can process the electrical-layer signal. The optical/electrical hybrid device is a device that can process an optical-layer signal and an electrical-layer signal. It should be noted that, based on an integration requirement, one network device may integrate a plurality of different functions. The embodiments may be applicable to network devices in different forms and integration degrees that need to process spectrums.

Figure 6:
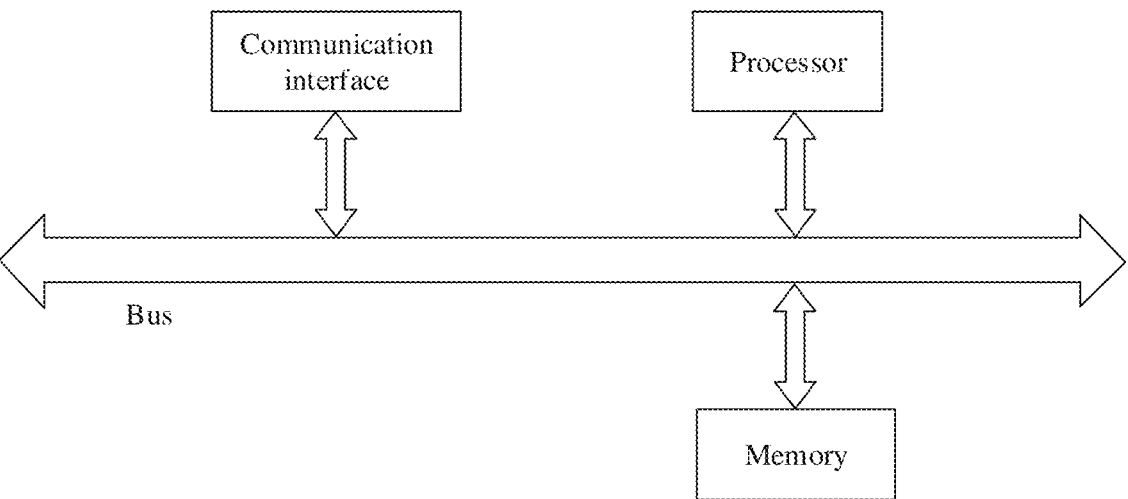
FIG. 6 is a schematic diagram of a structure of another network device according to an embodiment.

FIG. 6 is a schematic diagram of a structure of a network device according to an embodiment. A network device 600 includes a memory and a processor and may further include a communication interface and a bus. The processor, the communication interface, and the memory are connected by using the bus, and the processor is configured to execute an executable module of the memory, for example, a computer program.

The memory may include a high-speed random access memory (RAM), or may include a read-only memory, for example, at least one magnetic disk memory. A communication connection between the system network element and at least one of other network elements is implemented by using at least one communication interface (which may be wired or wireless). The other network elements may be the Internet, a wide area network, a local network, a metropolitan area network, and the like.

The bus may be an ISA bus, a PCI bus, an EASA bus, or the like. In addition, the bus may be classified into an address bus, a data bus, a control bus, and the like.

The processor may be a central processing unit, a general purpose processor, an application-specific integrated circuit (ASIC), a microprocessor, and a field programmable gate array (FPGA), or another programmable logic device, a transistor logic device, a hardware component, or any combination thereof.

The terms such as "first", "then", "finally" in the embodiments and the accompanying drawings are not intended to describe a particular order or sequence. It should be understood that data termed in such a way is interchangeable in proper circumstances, so that the embodiments described herein can be implemented in other orders than the order illustrated or described herein. Moreover, the term "include" or "contain" and any other variants mean to cover the non-exclusive solution, for example, a process, method, system, product, or device that includes a list of steps or units is not necessarily limited to those expressly listed steps or units, but may include other steps or units not expressly listed or inherent to such a process, method, system, product, or device.

The term "comprising" does not exclude another component or another step, and "a" or "one" does not exclude a case of a plurality. A single processor or another unit may implement several functions enumerated in the embodiments. Some measures are recorded in the various embodiments that are different from each other, but this does not mean that these measures cannot be combined to produce a better effect. A person skilled in the art should understand that the embodiments may be provided as a method, an apparatus (a device), or a computer program product. Therefore, the embodiments may use hardware, software, or a combination of software and hardware, which are collectively referred to as "modules" or "systems" herein. In addition, the embodiments may use a form of a computer program product that is implemented on one or more non-transitory computer-usable storage media (including but not limited to a disk memory, a CD-ROM, an optical memory, and the like) that include computer-usable program code. The computer program is stored/distributed in a proper medium and is provided as or used as a part of the hardware together with another hardware, or may be distributed in another manner, such as by using the Internet or another wired or wireless telecommunication system.

Although described with reference to features and the embodiments thereof, it is clear that various modifications and combinations may be made to them without departing from the spirit and scope of the embodiments. Correspondingly, the descriptions and the accompanying drawings are merely examples of the embodiments, and are considered as any of or all modifications, variations, combinations or equivalents that cover the scope of the embodiments. It is clear that a person skilled in the art can make various modifications and variations without departing from the spirit and scope of the embodiments.

What is claimed is:

1. A route calculation method comprising:
receiving, by a first device, a service request message, wherein the service request message is used to request the first device to determine a transmission path that bears a service requested by the service request message to be established;
before the first device receives the service request message, receiving, by the first device, second bearing capability information sent by another device; and
determining, by the first device, the transmission path based on the service request message and first bearing capability information from a plurality of devices corresponding to each link along the transmission path, wherein the first bearing capability information is used to indicate an actual bearing capability of each link on the transmission path and comprises an actual slot width of at least one link on the transmission path, the actual slot width corresponding to channel attenuation of the at least one link, wherein the second bearing capability information identifies an actual bearing capability of at least one of the links on the transmission path, and wherein the second bearing capability information is a subset of the first bearing capability information and the first bearing capability information includes the second bearing capability information.

2. The route calculation method according to claim 1, wherein the first bearing capability information comprises a service rate that can be supported by the at least one link on the transmission path.

3. The route calculation method according to claim 1, wherein the service request message comprises a path re-establishment request for an existing interrupted service.

4. The route calculation method according to claim 1, wherein the first device receives the second bearing capability information from said another device by using an extended device-to-device communication protocol, and the extended device-to-device communication protocol additionally comprises a message field to identify the second bearing capability information.

5. The route calculation method according to claim 1, wherein the first device stores third bearing capability information that identifies an actual bearing capability of a downstream link in which the first device is located, and wherein the first bearing capability information comprises a set of the second bearing capability information and the third bearing capability information.

6. A route calculation device, comprising:
a receiving module, configured to receive a service request message, and, before receiving the service request message, further configured to receive second bearing capability information sent by another device; and a calculation module, configured to determine a transmission path of a service based on the service request message and first bearing capability information from a plurality of devices corresponding to each link along the transmission path, wherein the first bearing capability information is used to indicate an actual bearing capability of the respective link on the transmission path and comprises an actual slot width of at least one link on the transmission path, the actual slot width corresponding to channel attenuation of the at least one link, wherein the second bearing capability information identifies an actual bearing capability of at least one of the links on the transmission path, and wherein the second bearing capability information is a subset of the first bearing capability information and the first bearing capability information includes the second bearing capability information.

7. The route calculation device according to claim 6, wherein the first bearing capability information comprises a service rate that can be supported by the at least one link on the transmission path.

8. The route calculation device according to claim 6, wherein the receiving module is further configured to receive the second bearing capability information from said another device by using an extended device-to-device communication protocol, and the extended device-to-device communication protocol additionally comprises a message field to identify the second bearing capability information.

9. The route calculation device according to claim 6, wherein the receiving module is further configured to:
  receive the service request message, wherein the service request message comprises a path re-establishment request for an existing interrupted service.

10. A system for determining a service transmission path, the system comprising: at least one route calculation device; the at least one route calculation device comprises:
  a receiving module, configured to receive a service request message, and, before receiving the service request message, further configured to receive second bearing capability information sent by another device; and
  a calculation module, configured to determine a transmission path of a service based on the service request message and first bearing capability information from a plurality of devices corresponding to each link along the transmission path, wherein the first bearing capability information is used to indicate an actual bearing capability of the respective link on the transmission path and comprises an actual slot width of at least one link on the transmission path, the actual slot width corresponding to channel attenuation of the at least one link, wherein the second bearing capability information identifies an actual bearing capability of at least one of the links on the transmission path, and wherein the second bearing capability information is a subset of the first bearing capability information and the first bearing capability information includes the second bearing capability information.

11. The system according to claim 10, wherein the first bearing capability information further comprises a service rate that can be supported by the at least one link on the transmission path.

12. A non-transitory computer-readable storage medium, wherein the computer-readable storage medium stores a computer program or instructions, and when the program or instructions are run, a device is driven to perform the route calculation method, wherein the method comprises:
  receiving, by a first device, a service request message, wherein the service request message is used to request the first device to determine a transmission path that bears a service requested by the service request message to be established;
  before the first device receives the service request message, receiving, by the first device, second bearing capability information sent by another device; and
  determining, by the first device, the transmission path based on the service request message and first bearing capability information from a plurality of devices corresponding to each link along the transmission path, wherein the first bearing capability information is used to indicate an actual bearing capability of the respective link on the transmission path and comprises an actual slot width of at least one link on the transmission path, the actual slot width corresponding to channel attenuation of the at least one link, wherein the second bearing capability information identifies an actual bearing capability of at least one of the links on the transmission path, and wherein the second bearing capability information is a subset of the first bearing capability information and the first bearing capability information includes the second bearing capability information.

13. The non-transitory computer-readable storage medium according to claim 12, wherein the first bearing capability information further comprises a service rate that can be supported by the at least one link on the transmission path.

14. The non-transitory computer-readable storage medium according to claim 12, wherein the first bearing capability information comprises:
  at least one of channel attenuation, a bearer wavelength, and a nominal slot width of the at least one link on the transmission path.

15. The non-transitory computer-readable storage medium according to claim 12, wherein the service request message comprises a path re-establishment request for an existing interrupted service.

* * * * *